US012536005B2

(12) United States Patent
Sandoz

(10) Patent No.: US 12,536,005 B2
(45) Date of Patent: *Jan. 27, 2026

(54) TRANSFORMING A JAVA PROGRAM USING A SYMBOLIC DESCRIPTION LANGUAGE MODEL

(71) Applicant: Oracle International Corporation, Redwood Shores, CA (US)

(72) Inventor: Paul D. Sandoz, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 18/168,161

(22) Filed: Feb. 13, 2023

(65) Prior Publication Data

US 2024/0272884 A1 Aug. 15, 2024

(51) Int. Cl.
*G06F 8/41* (2018.01)
(52) U.S. Cl.
CPC .................... *G06F 8/443* (2013.01)
(58) Field of Classification Search
CPC ... G06F 8/51; G06F 8/73; G06F 8/443; G06F 8/44
See application file for complete search history.

(56) References Cited

U.S. PATENT DOCUMENTS

| | | | |
|---|---|---|---|
| 5,784,553 A | 7/1998 | Kolawa et al. | |
| 9,015,680 B1 | 4/2015 | Shropshire | |
| 10,853,041 B2 | 12/2020 | Tsingauz et al. | |
| 2005/0193359 A1 | 9/2005 | Gupta et al. | |
| 2007/0006191 A1 | 1/2007 | Franz et al. | |
| 2007/0162246 A1 | 7/2007 | Barcia | |
| 2008/0222616 A1* | 9/2008 | Cheng | G06F 8/51 717/137 |
| 2012/0079465 A1 | 3/2012 | Harvey | |
| 2013/0198727 A1 | 8/2013 | Darcy et al. | |
| 2013/0247017 A1 | 9/2013 | Bernecker | |
| 2014/0325489 A1 | 10/2014 | Yoshida | |
| 2016/0110176 A1* | 4/2016 | Fink | G06F 8/456 717/137 |
| 2016/0357533 A1* | 12/2016 | De | G06F 8/51 |
| 2017/0139690 A1* | 5/2017 | Pesarese | G06F 8/41 |
| 2018/0143814 A1* | 5/2018 | Bucuvalas | G06F 8/72 |
| 2019/0196939 A1 | 6/2019 | Lengauer et al. | |
| 2021/0240456 A1 | 8/2021 | Dwars et al. | |
| 2022/0067538 A1* | 3/2022 | Choudhary | G06F 8/433 |
| 2022/0197617 A1 | 6/2022 | Schrammel | |

(Continued)

OTHER PUBLICATIONS

Innes, M. (2018). Don't unroll adjoint: Differentiating SSA-form programs. arXiv preprint arXiv:1810.07951. (Year: 2018).*

(Continued)

*Primary Examiner* — Wei Y Mui
*Assistant Examiner* — Vivian Weijia Duan
(74) *Attorney, Agent, or Firm* — Invoke

(57) ABSTRACT

Techniques for transforming Java source code using a symbolic description language are disclosed, including: obtaining a set of Java source code corresponding to a Java program; generating a symbolic description language (SDL) model of the set of Java source code; generating, based on the SDL model, a transformed program including at least one transformation relative to the Java program.

19 Claims, 8 Drawing Sheets

(56) References Cited

U.S. PATENT DOCUMENTS

2023/0401069 A1    12/2023    Chu

OTHER PUBLICATIONS

Sampson, A. (2022). "Lesson 6: Static Single Assignment". (Year: 2022).*

Amme, W., Ronne, J. V., & Franz, M. (2007). SSA-based mobile code: Implementation and empirical evaluation. ACM Transactions on Architecture and Code Optimization (TACO), 4(2), 13-es. (Year: 2007).*

Li, Y., Tan, T., & Xue, J. (2019). Understanding and analyzing java reflection. ACM Transactions on Software Engineering and Methodology (TOSEM), 28(2), 1-50. (Year: 2019).*

Farooq, U. (2018), "Neural Machine Translation with Code", Medium.com. (Year: 2018).*

Bondhugula U., "High Performance Code Generation in MLIR: An Early Case Study with GEMM", Mar. 1, 2020, 23 Pages.

Braione et al., "JBSE: a symbolic executor for Java programs with complex heap inputs", FSE 2016: Proceedings of the 2016 24th ACM SIGSOFT International Symposium on Foundations of Software Engineering, Nov. 2016, pp. 1018-1022.

Jolly et al., "Symbolic Script Programming for Java", Oct. 26, 2018, 16 Pages.

Lattner et al., "MLIR: A Compiler Infrastructure for the End of Moore's Law", Mar. 1, 2020, 21 Pages.

Otto C., "Java Program Analysis by Symbolic Execution", Department of Computer Science, Mar. 2015, pp. 224.

P?as?areanu et al., "Symbolic PathFinder: symbolic execution of Java bytecode", ASE '10: Proceedings of the 25th IEEE/ACM International Conference on Automated Software Engineering, Sep. 2010, pp. 179-180.

Dockins et al., "Constructing Semantic Models of Programs with the Software Analysis Workbench", Jul. 2016, p. 18.

Rodriguez-Prieto et al., "An Efficient and Scalable Platform for Java Source Code Analysis Using Overlaid Graph Representations", IEEE Access, Apr. 29, 2020, vol. 8, pp. 72239-72260.

Lattner et al., "MLIR: Scaling Compiler Infrastructure for Domain Specific Computation", 2021 IEEE/ACM International Symposium on Code Generation and Optimization, 2021, pp. 2-14.

Zhao et al., "Design and implementation of DeepDSL: A DSL for deep learning", Computer Languages, Systems & Structures, vol. 54, Apr. 25, 2018, pp. 39-70.

\* cited by examiner

TRANSFORMING A JAVA PROGRAM USING A SYMBOLIC DESCRIPTION LANGUAGE MODEL

CROSS-REFERENCE TO RELATED APPLICATIONS

This application includes subject matter that is related to subject matter disclosed in U.S. patent application Ser. No. 18/168,025, filed on Feb. 13, 2023, titled "MODELING JAVA SOURCE CODE IN A SYMBOLIC DESCRIPTION LANGUAGE," which is hereby incorporated by reference.

TECHNICAL FIELD

The present disclosure relates to transforming code from one form to another form. In particular, the present disclosure relates to transforming a Java program.

BACKGROUND

In general, a Java compiler receives Java source code and generates bytecode compiled to the specification of the Java Virtual Machine (JVM). In the process of compiling the source code, much of the information included in the source code can be lost. For example, Java bytecode does not preserve language constructs such as lambda expressions, try/catch/finally blocks, loops, patterns, etc.

Code reflection is the process of inspecting code at runtime (i.e., during execution of the bytecode by the JVM), to determine one or more properties of the code. For example, given a runtime object of an unknown type, reflection operations may determine the type name and whether the type includes a particular method. Generally, reflection generally allows only for a runtime query to obtain the "surface" details of a class, such as: the type of the class itself; its fields; its method declarations; etc. The code of a method body itself is opaque and cannot be queried via reflection.

In some cases, due to the limitations of reflection, developers may resort to ad-hoc solutions to attempt to obtain more information. For example, a developer may write code to obtain the bytecode of a method. Because the Java platform does not provide any standard way to access the bytecode of a method, such approaches must be ad hoc and/or platform dependent. Even then, bytecode is designed for execution by the Java Virtual Machine, and the process of compiling source code to bytecode destroys information such as structures and types. In addition, different Java compiler implementations use different translation strategies, resulting in different bytecodes even though the program meaning is preserved across compilers in accordance with the Java specifications. Because bytecode does not preserve all language constructs, approaches that rely on bytecode are limited to information that is not destroyed in the compilation to bytecode. Moreover, such ad-hoc solutions are not generalizable to other situations and may require modifying the compiler itself.

In view of the above, the information available to Java programs via reflection (including ad-hoc solutions) often is insufficient for the desired purpose. For example, reflection does not provide sufficient information to generate new code that preserves the originating code's language structures. Reflection also does not provide sufficient information to generate transformations of original programs, such as differentiated programs, optimized programs, functionally similar programs compiled according to different language specifications, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

Figure 1:
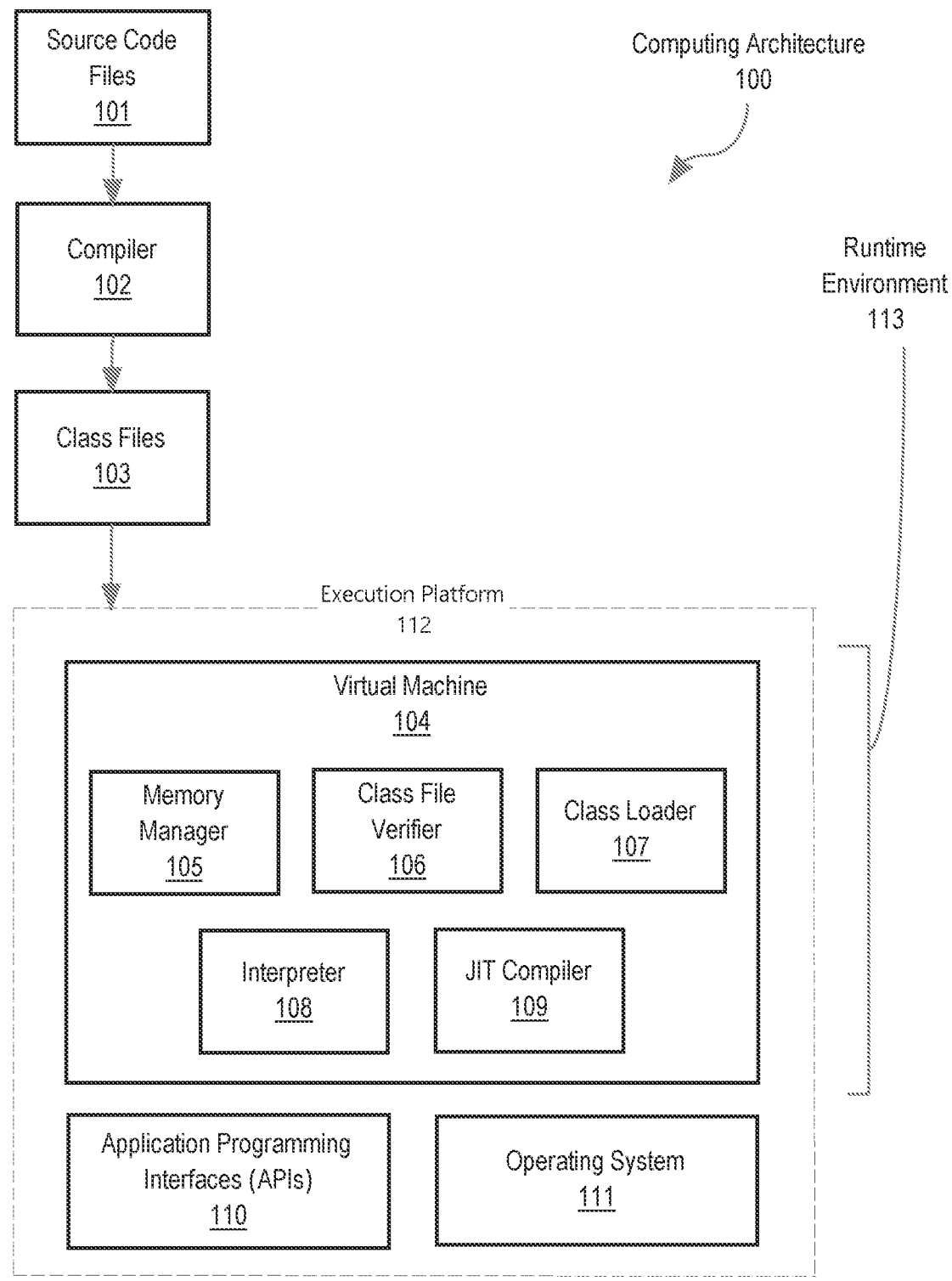
FIG. 1 illustrates an example computing architecture in which techniques described herein may be practiced.

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVER VIEW . . . 6
2. ARCHITECTURAL OVERVIEW . . . 6
    2.1 EXAMPLE ARCHITECTURE . . . 6
    2.2. EXAMPLE CLASS FILE STRUCTURE . . . 10
    2.3. EXAMPLE VIRTUAL MACHINE ARCHITECTURE . . . 13
    2.4 LOADING, LINKING, AND INITIALIZING . . . 16
3. SYMBOLIC DESCRIPTION LANGUAGE . . . 19
    3.1. GENERAL SDL FEATURES . . . 19
    3.2 EXAMPLE SDL SCHEMA . . . 19
4. TRANSFORMING A JAVA PROGRAM USING A SYMBOLIC DESCRIPTION LANGUAGE (SDL) MODEL . . . 23

4.1. JAVA CORE DIALECT . . . 25
    4.1.1. MODELING JAVA METHODS . . . 26
    4.1.2. STATIC METHODS . . . 27
    4.1.3. INSTANCE METHODS . . . 27
    4.1.4. GENERIC METHODS . . . 28
    4.1.5. ANNOTATED METHODS . . . 29
    4.1.6. EXCEPTIONS . . . 29
    4.1.7. MODELING FIELD ACCESS . . . 29
    4.1.8. MODELING METHOD CALLS . . . 30
    4.1.9. REFLECTION OPERATIONS . . . 30
    4.1.10. RESOLUTION AND ACCESS CONTROL . . . 31
    4.1.11. STATIC AND INSTANCE METHODS AND FIELDS . . . 32
    4.1.12. CASTING AND CONVERSIONS . . . 32
    4.1.13. GUARDING AGAINST HEAP POLLUTION . . . 32
    4.1.14. TRANSLATION TO BYTECODE . . . 33
    4.1.15. MODELING LAMBDA EXPRESSIONS . . . 33
    4.1.16. QUOTING OPERATIONS . . . 34
    4.1.17. MODELING LOCAL VARIABLES . . . 35
4.2. JAVA HIGH-LEVEL DIALECT . . . 36
    4.2.1. MODELING LOOPS . . . 37
    4.2.2. MODELING ENHANCED FOR LOOPS . . . 37
    4.2.3. MODELING COUNTED FOR LOOPS . . . 40
    4.2.4. MODELING WHILE LOOPS . . . 41
    4.2.5. MODELING IF-THEN AND IF-THEN-ELSE STATEMENTS . . . 43
    4.2.6. MODELING TRY/CATCH/FINALLY . . . 46
5. TRANSFORMING A JAVA PROGRAM USING AN SDL MODEL . . . 49
6 EXAMPLE EMBODIMENTS . . . 52
7. MACHINE LEARNING . . . 53
8. ADDITIONAL EXAMPLES . . . 54
9. COMPUTER NETWORKS AND CLOUD NETWORKS . . . 56
10. HARDWARE OVERVIEW . . . 60
11. MISCELLANEOUS; EXTENSIONS . . . 63

1. GENERAL OVERVIEW

One or more embodiments generate symbolic description language (SDL) representations of Java source code. For example, the Java compiler may produce an SDL representation from the source of the body of a given method or lambda expression. An SDL representation of Java source code preserves language constructs that would otherwise be lost during compilation to bytecode (e.g., structural and type information), and can be retrieved at runtime. Thus, the SDL representation allows for more reflection operations than would otherwise be available.

Using SDL representations of Java programs, the system may generate transformations of those programs. For example, the system may generate a differentiated program, optimized program, functionally similar program in a different programming language, etc., without requiring an ad-hoc solution. SDL generation may be added to the Java compiler and/or provided as a stand-alone tool. The JVM may be modified so that reflection operations are performed on the corresponding SDL representation, rather than on the bytecode. To access an existing SDL representation, the system may first use standard reflection to obtain the SDL representation. For example, to access the SDL representation of a method body (if present), the system may first obtain the java.lang.reflect.Method instance. The system may then query the reflective object for its SDL representation. Thus, one or more embodiments allow for a wide range of runtime functionality that is not otherwise a standard part of the Java development and runtime environments.

One or more embodiments described in this Specification and/or recited in the claims may not be included in this General Overview section.

2. ARCHITECTURAL OVERVIEW 2.1. Example Architecture

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.2. Example Class File Structure

Figure 2:
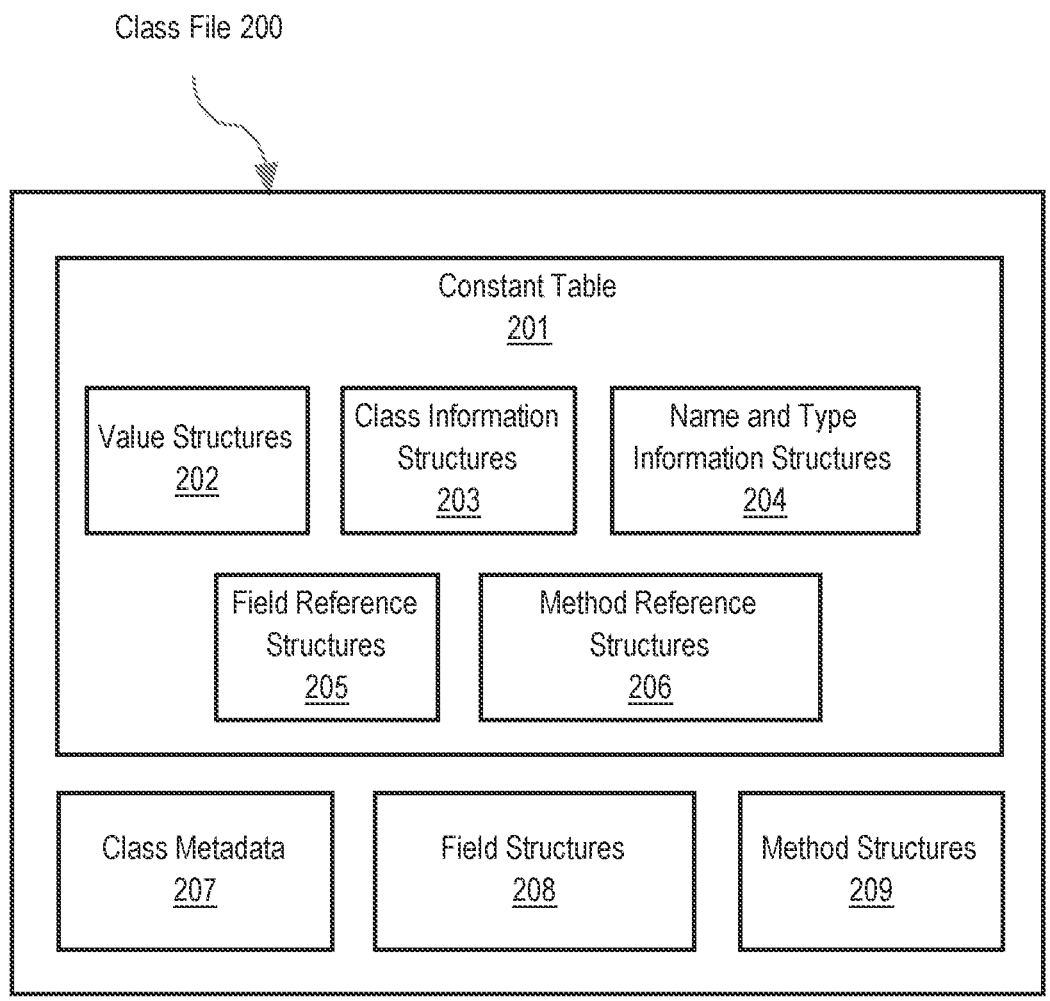
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3. Example Virtual Machine Architecture

Figure 3:
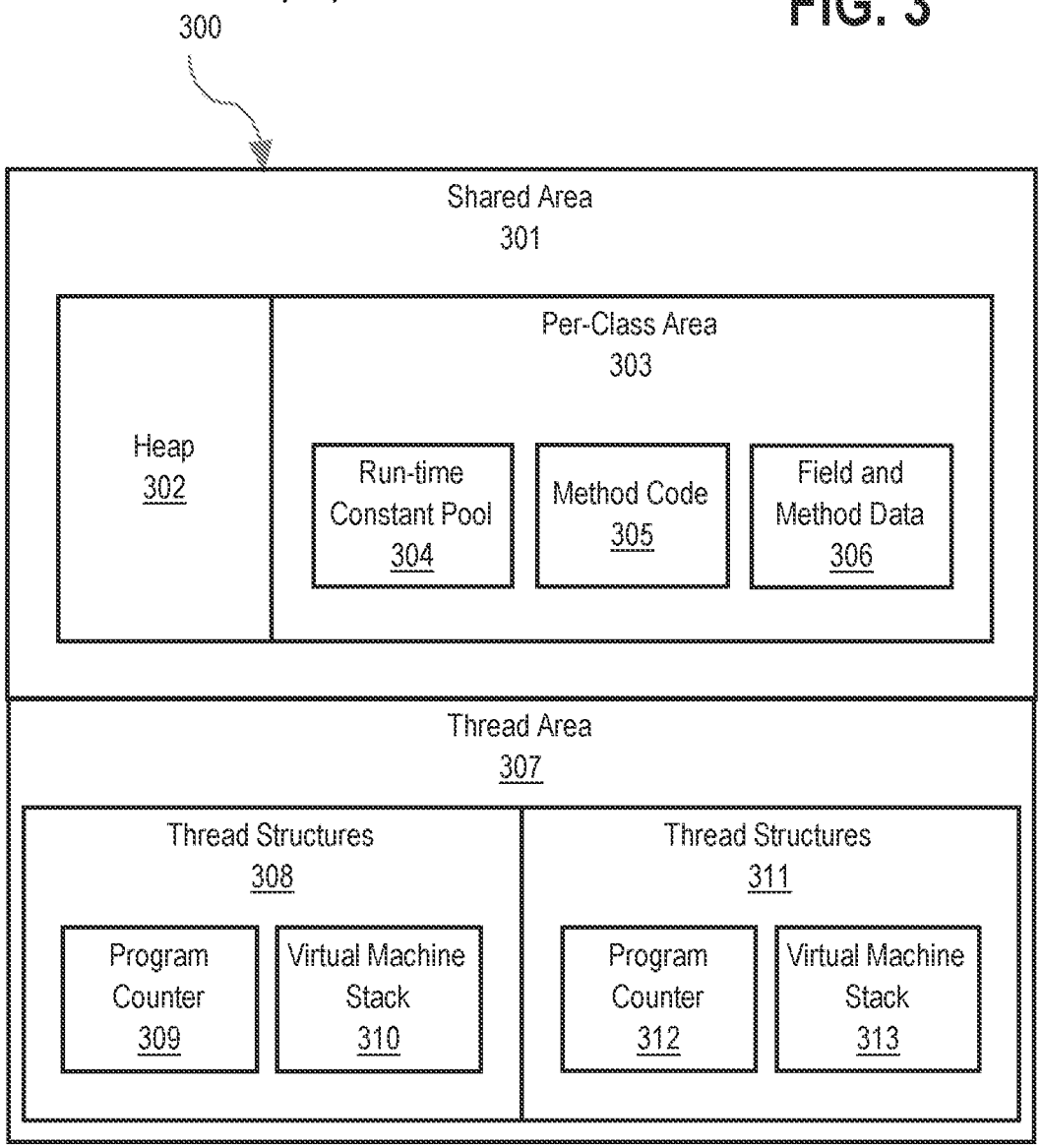
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
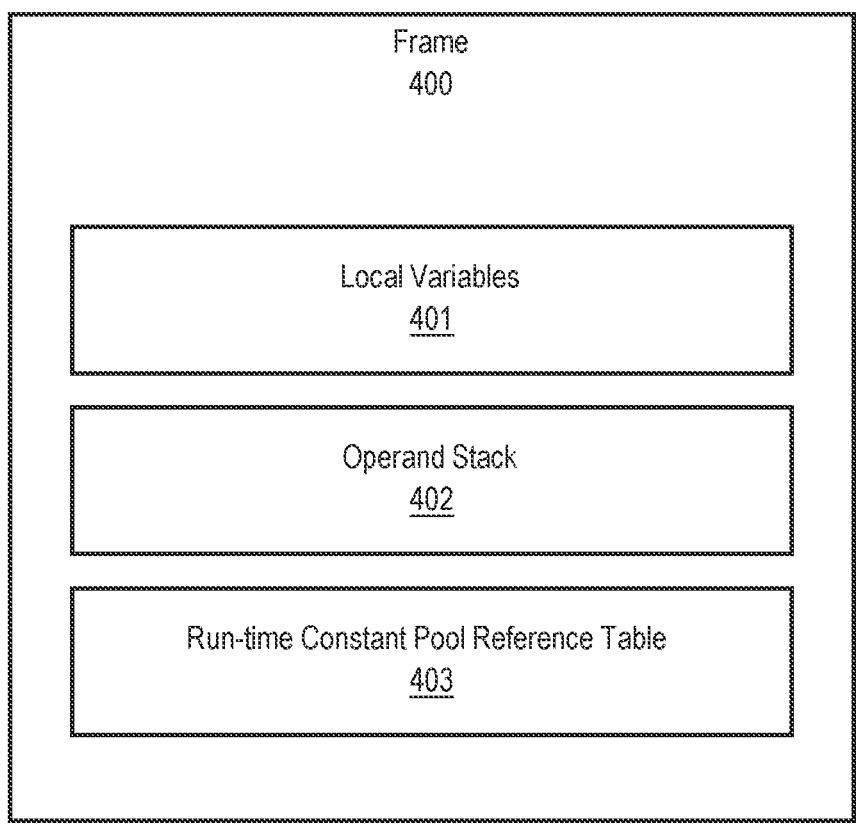
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4. Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. SYMBOLIC DESCRIPTION LANGUAGE 3.1. General SDL Features

In an embodiment, a symbolic description language (SDL) uses a language of predefined symbols to describe the structure and functionality of a set of Java source code. The SDL includes symbols that are the building blocks for describing Java language constructs. For example, the SDL may include values, operations, bodies, and/or blocks as described below. Various permutations of the symbols can represent Java modules, packages, types (e.g., classes), methods, variables, instructions (e.g., method calls), assignments, etc. The SDL may supply a schema that allows for nested operations, so that the SDL can represent loops and other non-linear language constructs. Thus, the SDL representation of a particular set of Java source code preserves language constructs that are lost in bytecode. One example of an SDL schema is described in detail below.

3.2. Example SDL Schema

Figure 5:
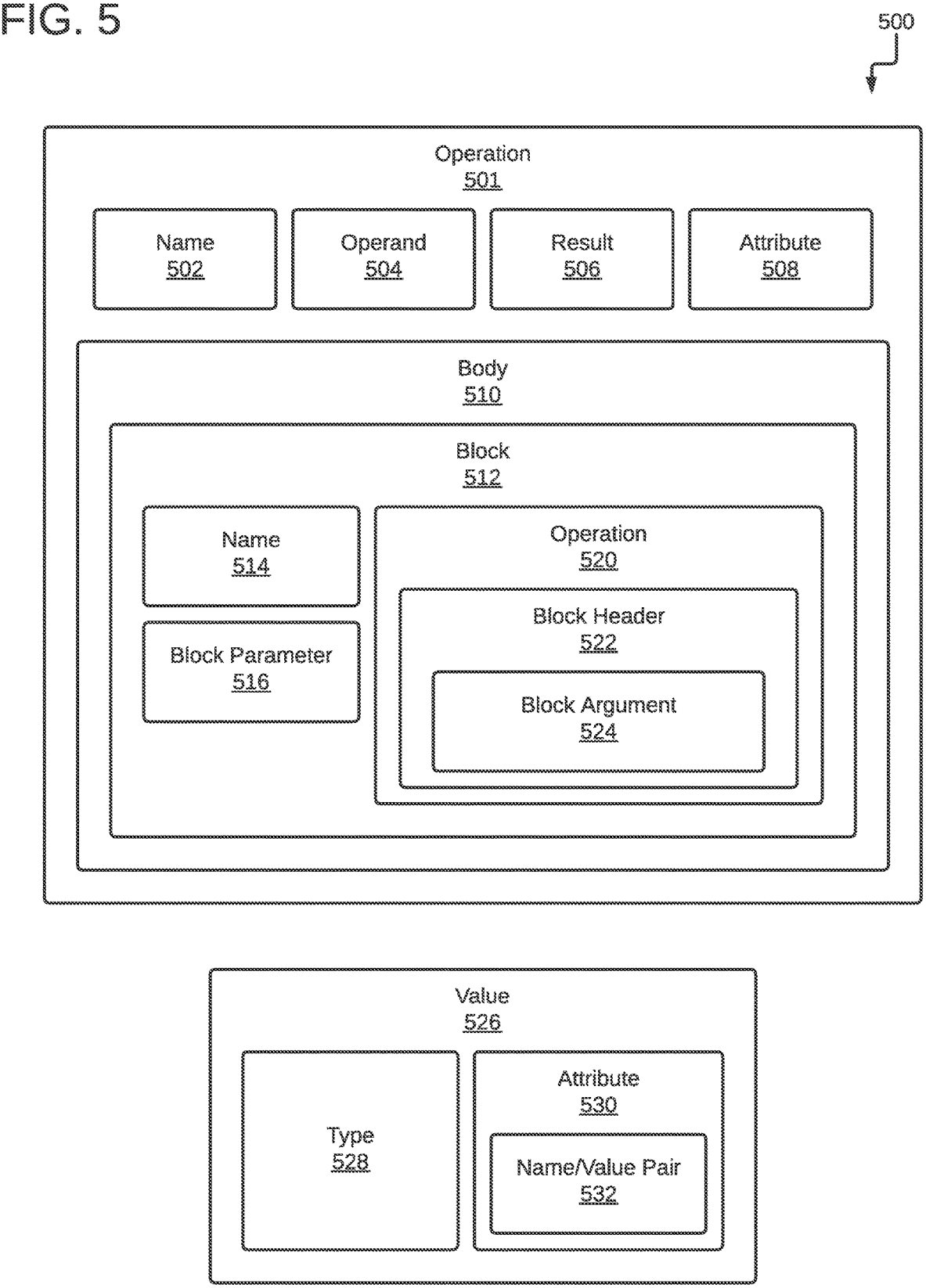
FIG. 5 shows a block diagram of an SDL operation schema in accordance with one or more embodiments.

FIG. 5 illustrates an example of a symbolic description language schema 500 in accordance with one or more embodiments. This schema 500 should be understood as one specific example which may not be applicable to certain embodiments. Accordingly, components and/or operations described below should not be construed as limiting the scope of any of the claims. In this example, the building blocks of an SDL schema 500 are values 526, operations 501, bodies 510, and blocks 512. Some embodiments may include more or fewer building blocks, building blocks of different names, and/or building blocks of different types.

In an embodiment, an SDL schema 500 does not prescribe any semantics to operations 501. An operation 501 may include:
  A name 502 that uniquely identifies the definition of the operation 501 and describes the operational behavior.
  Zero or more operands 504, each operand 504 being a respective value 526.
  A operation result 506 which is a value 526.
  Zero or more attributes 508, described in further detail below.
  Zero or more bodies 510, described in further detail below.

A body 510 includes one or more blocks 512. The first block 512 in a body 510 is referred to herein as the entry block. Each block 512 includes a unique name 514 of the block 512 and one or more operations 520. A block 512 may include zero or more arguments 516 that are values 526.

The last operation 520 in a block 512 is referred to herein as the terminal operation. A terminal operation includes zero or more block headers 522 that reference other blocks 512 in the same body 510, by name 514. A terminal operation may reference another block 512 as its successor using a block header 522. A block header 522 includes zero or more block arguments 524, each a value 526, corresponding to arguments 516 of the referenced block 512. Depending on the operation 520 definition, the block(s) 512 of the body 510 may form a control flow graph. In an embodiment, a terminal operation is not permitted to reference the entry block as a successor, in which case the entry block has no predecessors and is the root of the control flow graph.

In an embodiment, values 526 are assigned exactly once by operation results 506 or block parameters 516, and are used by operations 501 as operands 504 and/or block arguments 524. Thus, by definition, the SDL supports the property of static single-assignment form (SSA), as the term applies to compiler design.

Based on the above, a symbolic description is conceptually a tree of operation→body*→block+→operation+, where * indicates zero or more nodes and + indicates one or more nodes. Depending on the operation definition(s), the blocks 512 of a body 510 may form a control flow graph. Via their usages, the values 526 form a data flow graph.

A value 526 includes a type descriptor, often referred to simply as a type 528, and zero or more attributes 530. A type 528 defines a set of values 526 such that a value 526 of that type 528 is a member of that set. Otherwise, the SDL does not prescribe semantics to types 528, i.e., how the set of values 526 of a given type 528 is determined. An attribute 530 includes a name/value pair 532. Note that in this context, the value included in the name/value pair 532 is different from the kind of value 526 used as operation results 506 and block parameters 516. The SDL does not prescribe semantics to attributes 530.

An operation 501 has a method type whose parameter types include the operand 504 types (in order) and a return type that is the operation result 506 type. A body 510 has a method type whose parameter value types include the entry block parameter 516 types (in order) and a return value type specified by the operation definition. A block 512 has a method type whose parameter value types include the block parameter 516 types (in order) and a return value type that is void or "unit" (because blocks 512 themselves do not explicitly return values).

3.2.1. Control Flow

In this example, an operation 501 that includes one or more bodies 510 can enter a body 510 and pass control to the entry block 512, assigning values 526 to the entry block parameter(s) 516 (if any). A block 512 can pass control to its first operation 520. After completing according to its definition, the operation 520 passes control back to the block 512. The block 512 then passes control to the next operation 520, and so on until the terminal operation 520 is reached. A terminal operation 520 that includes a block header 522 indicates that the operation 520, according to its definition, can pass control (or jump) to the referenced block 512 and pass block arguments 524 that are assigned to the corresponding block parameters 516. A terminal operation 520 with no block header 522 passes control back to the operation 501.

3.2.2. Value Use

The structural properties of a given value 526 determine if the value 526 can be used as an operand 504 or block argument 524.

As an example, a value V must be defined before it is used by an operation O. O can use V if V is:
  the operation result of an operation in O's block, B say, occurring before O, or a block parameter of B, or
  the operation result of an operation in a block D that dominates B, or a block parameter of D. Here, "dominating" has the meaning used in graph theory; a node N1 dominates another node N2 if every path from the entry node to N2 passes through N1.
  Otherwise, O becomes the parent operation of O and the previous two rules are recursively applied, traversing up the tree. If O has no parent operation, then V is undefined and cannot be used. An operation definition may specify that one or more of its bodies is/are isolated, in which case the latter rule may be refined to terminate if the parent body of O is isolated.

3.2.3. Dialects

In an embodiment, the programmatic behavior of a symbolic description (i.e., a description written in the SDL) is governed by the operations declared (by name) in the description, the sequence of those operations in blocks, and the logical connections between those blocks. As used herein, a "dialect" is a set of operations and types that provide some composed unit of capability. A symbolic description may include operations and value types from more than one dialect. The type-correctness of a symbolic description is governed by the dialect types.

3.2.4. Forms of Symbolic Descriptions

One or more embodiments support at least two forms of symbolic descriptions: a runtime form in computer memory; and a textual form. A Java API may be configured to generate the runtime form (e.g., during compilation). Alternatively or additionally, a separate tool (e.g., a script or executable file) may be configured to parse the description in the textual form and generate the runtime form. If the Java API exposes commands for generating the runtime form, the tool may be configured to use the Java API. The textual form may be specified using a grammar corresponding to the structure of the SDL. The Java API and/or another tool may be configured to generate the textual form from the runtime form. Alternatively or additionally, a human user (e.g., a programmer) may generate the textual form by hand. The textual form may be useful for debugging, testing, storage and/or transport over a network, etc. In addition, the textual form is a convenient, human-readable way to present symbolic descriptions for explanation—including examples described herein of modeling Java language constructs.

4. TRANSFORMING A JAVA PROGRAM USING A SYMBOLIC DESCRIPTION LANGUAGE (SDL) MODEL

Using a symbolic description language (SDL) such as that described above, Java language constructs can be modeled as operations, either directly or by composition. Modeling Java language constructs may employ multiple SDL dialects (defined above). Examples described herein define two dialects: a core dialect and a high-level dialect.

The core dialect includes:
Operations that model Java methods, lambda expressions, operations on primitive values, etc.
Exception regions covered by try/catch/finally code blocks, which are supported in the high-level dialect.
Definitions of type descriptors that model Java's built-in type system, so that SDL type descriptions include full type information (unlike that of bytecode where reference types are erased and primitive types are reduced). In some embodiments, the SDL does not retain full type fidelity, because types can appear in the compiler's abstract syntax tree (AST) that are not present in source code. Some of those types may be non-denotable (i.e., not capable of being expressed in source code) and therefore may be too complex to support in the type descriptors of the SDL. In addition, the SDL for some denotable types may be approximate representations, for simplification purposes.
Definitions of method and field descriptors, which include type descriptors and are declared in attributes of operations. Additional details are described in the section below on reflection operations.

The high-level dialect includes operations that model Java language constructs such as loops, if/then/else code blocks, etc. These operations may use types defined by the core dialect.

One or more embodiments further include a line number attribute (e.g., "line.number") that may apply to operations. The line number attribute may be a non-negative integral number that corresponds to a given line number in the original source code. The line number attribute may be optional and/or user-configurable, for example, at the module, package, class, or method level.

An enhanced version of the Java compiler may be configured to generate symbolic descriptions representing Java programs that correspond to the bodies of Java methods and/or Lambda expressions. Such symbolic descriptions are valid, type correct, Java programs and may include operations from both dialects.

An operation of the high-level dialect has the property that it can be transformed (or lowered) to one or more operations of the core dialect. Lowering preserves the semantics of the program and may allow for easier analysis of control and data flow. However, lowering erases structure that is hard to precisely recover. Accordingly, lowering high-level dialect to core dialect may be optional and/or user-configurable.

In an embodiment, the SDL representation of a Java program can be compiled to bytecode. To compile SDL to bytecode, one or more embodiments transform the SDL such that all high-level operations are lowered into core operations. The resulting description includes only core operations and can more easily be compiled to bytecode.

As the Java programming language evolves and new language features are added, corresponding SDL representations may be modeled. Modeling a new language feature may include new core operations, new high-level operations, and/or existing operations (core and/or high-level).

In one example, a library that consumes symbolic descriptions was compiled on version V1 of the Java platform. An application compiled on at later version V2 of the Java platform uses that library and supplies symbolic descriptions to the library. V2 of the Java platform introduces a new Java language feature that is modeled as a high-level operation, and the application uses this language feature in bodies that are represented as symbolic descriptions. The library does not understand the new high-level operation. However, it can still lower the operation into core operations that it does understand. This capability helps ensure a degree of forward compatibility. However, as with adding a new bytecode instruction, libraries compiled to a prior version of the Java platform that encounter the new operation may fail.

4.1. Java Core Dialect

In an embodiment, the Java core dialect includes the operations listed in Table 1. In addition, one or more embodiments include a set of arithmetic operations (binary, unary, test) on primitive values. These operations are not listed in Table 1 because their names are self-explanatory; for example, the operation "cos" returns the trigonometric cosine of an angle. In the interest of concision, some arithmetic operations may model methods on java.lang.Math, rather than as method calls. Some operations that are included in the core dialect are discussed in further detail below.

TABLE 1

Operations in Java Core Dialect

| Operation | Description |
|---|---|
| func | models a method (static or instance) |
| lambda | models a lambda expression |
| method-ref | models a method reference |
| call | models a method call |
| constant | models the declaration of a constant |
| quoted | quotes an operation |

TABLE 1-continued

Operations in Java Core Dialect

| Operation | Description |
| --- | --- |
| module | groups func operations |
| func.call | calls a func operation |
| field.load | models a field load (static or instance) |
| field.store | models a field store (static or instance) |
| array.load | models an array load |
| array.store | models an array store |
| array.length | models array length access |
| new | models new |
| instanceof | models an instanceof expression |
| cast | models a cast expression |
| conv | models primitive conversions |
| throw | models a throw statement |
| return | models a return statement |
| unreachable | a terminal op that is unreachable |
| br | branches unconditionally to a successor block |
| cond_br | branches conditionally to successor blocks |
| var | models a local variable |
| var.load | loads the value of a local variable |
| var.store | stores a value to a local variable |
| tuple | creates a tuple |
| tuple.load | loads the component value of a tuple |
| tuple.with | replaces the component value of a tuple |

4.1.1. Modeling Java Methods

One or more embodiments use SDL to model static methods, instance methods, and method signatures. In this example, the func operation definition is used to model Java methods. A func operation that symbolically describes a Java method m includes:

A symbolic name attribute whose value is m.
An optional method descriptor attribute, for example named "source," that describe the signature of method m.
An operation result that is void.

The func operation includes a body that is isolated. Java methods, like functions, cannot capture values. Therefore, any nested operations are not permitted to refer to values defined outside the body. If the Java programming language were modified in the future to support capturing values, the func operation may be adjusted accordingly and/or a new operation may be defined to support the expanded functionality.

The body of the func operation includes blocks and operations that describe the code of the method body. The body's entry block includes N block parameters—one for each of m's parameters—in order. For a given parameter p whose type is t, the block parameter's name is p and includes a type descriptor describing t. The body's method type includes a return type that describes m's return type. The terminal return operation exits the function and passes control back to the callee.

4.1.2. Static Methods

Modeling static methods is described here by way of an example, in which a static method m is declared in class Foo:

```
class Foo {
    static int m(int x, int y) {
        ...
    }
}
```

The symbolic representation of m in textual form is:

```
func @"m" @source="Foo::m(int, int)int" (%x : int, %y : int)int -> {
    ...
}
```

Note that in this example, the textual form fuses the body and entry block. In addition, modeling classes is not needed. To model the parameters of the method m as local variables rather than in pure Single Static Assignment (SSA) form, each block parameter type may be of Var<T>, where T is the corresponding method parameter type:

```
func @"m" @source="Foo::m(int, int)int" (%x : Var<int>, %y : Var<int>)int -> {
    ...
}
```

Alternatively or additionally, local variables may be modeled inline:

```
func @"m" @source="Foo::m(int, int)int" (%_x : int, %_y : int)int -> {
    %x : Var<int> = var %_x  @"x"
    %y : Var<int> = var %_y  @"y"
    ...
}
```

4.1.3. Instance Methods

One or more embodiments model instance methods with an additional block parameter occurring before all other arguments. This argument corresponds to "this," whose type describes the type that declares the method. Specifically, for an example class Foo defined as:

```
class Foo {
    int m(int x, int y) {
        ...
    }
}
``` the corresponding SDL representation of instance method m is:

```
func @"m" @source="Foo::m(int, int)int" (%this : Foo, %x : int, %y : int)int -> {
    ...
}
```

Note that the source method descriptor includes one fewer argument than the entry block parameters. This cannot be assigned to, so it is not modeled as a local variable. In addition, because the source method descriptor can be resolved to determine the method modifiers, it is not necessary to model them directly.

4.1.4. Generic Methods

It is not necessary to directly model type parameters declared by a generic method. However, model type variables declared in a method's parameter types do need to be modeled. Thus, for an example class Foo defined as:

```
class Foo {
    <T extends Number> T m(T x, T y) {
        ...
    }
}
``` the corresponding SDL representation of instance method m is:

```
func @"m" @source="Foo::m(Number, Number)Number" (%this : Foo,
x: #T, y : #T)#T
    -> {
        ...
}
```

The body's method type descriptor has parameter types and return type of type variable T.

One or more embodiments resolve the source method descriptor to an instance of java.lang.reflect.Method and query the type parameter, to determine that the type parameter introduces type variable T. This type variable would shadow any type variable of the same name introduced by the class declaration of Foo, if it were also generic.

4.1.5. Annotated Methods

In an embodiment, it is not necessary to model annotations declared on methods or on a method's parameters. Instead, one or more embodiments obtain such declarations by resolving the source method descriptor.

4.1.6. Exceptions

In an embodiment, it is not necessary to model method "throws" clauses. Instead, to obtain the exceptions declared to be thrown, one or more embodiments resolve the source method descriptor.

4.1.7. Modeling Field Access

In an embodiment, the field.load and field.store operations model field access expressions for reading values from fields and assigning values to fields.

A field.load operation that symbolically describes field access to the field's value includes:
  zero or one operand that is the receiver of the field (optional).
  a field descriptor attribute describing the method to call. The field descriptor can be resolved to an instance of java.lang.reflect.Field, assuming referenced classes are present at resolution time.
  a result type that is compatible with the field type of the field descriptor.

A field.store operation that symbolically describes field access to assign a value to the field includes:
  one or two operands that are the receiver of the field (optional) and the value to assign to the field.
  a field descriptor attribute describing the field to call. The field descriptor can be resolved to an instance of java.lang.reflect.Field, assuming referenced classes are present at resolution time.
  a result type of void.

If the number of operands of the field.load operation is one, or the number of operands of the field.store operation is two, then the field access is to an instance field. Otherwise, the field access is to a static field.

4.1.8. Modeling Method Calls

In an embodiment, the call operation definition models call expression. A call operation that symbolically describes a method call includes:
  zero or more operands corresponding to (a) optionally, the receiver of the method and (b) zero or more arguments to the method.
  a method descriptor attribute describing the method to call. The method descriptor can be resolved to an instance of java.lang.reflect. Method, assuming referenced classes are present at resolution time.
  a result type that is compatible with the return type of the method descriptor.

If the number of operands of the call operation is one greater than the number of parameters of the method descriptor, then: the call is to an instance method; the first operand is the receiver; and subsequent operand are arguments. Otherwise, the call is to a static method.

An example of a call operation is described in further detail below.

4.1.9. Reflection Operations

In an embodiment, Java language constructs that interact at runtime with types, classes, and objects (for example, to instantiate a new object or call a method) are modeled as reflective operations whose behavior is specified by Java reflection.

Reflective operations declare descriptors, type, method type, method, or field descriptors, that describe reflective information. A descriptor can be unambiguously resolved, with appropriate access permissions if needed, to instances of reflective classes in the java.lang, java.lang.reflect, and java.lang.invoke packages.

A descriptor can be translated to equivalent bytecode descriptors that may be encoded in the constant pool of a classfile. This approach facilitates interpretation of reflective operations or translation to equivalent bytecode instructions (e.g., a method call may translate to an invokevirtual instruction). For example, in an embodiment, the reflective operation that models a method call includes a method descriptor that can be resolved to an instance of java.lang.reflect.Method or java.lang.invoke.MethodHandle.

The set of reflection operations are:
  new, for instantiating objects and array objects, accepting a method type descriptor.
  call, for calling static or instance methods, accepting a method descriptor.
  field.load and field.store, for accessing static or instance fields, accepting a field descriptor.
  array.load and array.store, for accessing arrays, accepting a type descriptor.
  method-ref, for target typing a method to a functional interface, accepting a method descriptor.
  cast, for casting an object to another type, accepting a type descriptor.
  instanceof, for determining if an object is an instance of a type, accepting a type descriptor.

4.1.10. Resolution and Access Control

In an embodiment, method, field, and method type descriptors are resolved as follows:
  Method descriptors are resolved to instances of java.lang.reflect.Method or java.lang.invoke.MethodHandle.
  Field descriptors are resolved to instances of java.lang.reflect.Field or java.lang.invoke.MethodHandle.
  Method type descriptors are resolved to instances of java.lang.invoke.MethodType. Type descriptors are resolved to instances of java.lang.Class.
A MethodHandles.Lookup instance may be granted capability to resolve methods, fields, method handles, or classes from an operation's descriptor. For type descriptors, resolution may use MethodHandles.Lookup.findClass.

4.1.11. Static and Instance Methods and Fields

In an embodiment, method and field descriptors do not themselves distinguish between static and instance methods. This distinction may be determined by each descriptor's use with reflective operations. For a method-ref, this may be determined from the functional interface and its single abstract method.

In an embodiment, a call operation's method descriptor includes additional information that indicates whether it translates to bytecode as an invokespecial operation.

4.1.12. Casting and Conversions

In an embodiment, the operand(s) and result of at least some reflective operations are specified to be cast or converted—specifically, as if a MethodHandle is looked up by resolving the descriptor, adapted to the operand types and result type using MethodHandle.asType, and then invoked with MethodHandle.invokeWithArguments. This approach reduces the places in a symbolic description where explicit casting or conversion is required.

4.1.13. Guarding Against Heap Pollution

In an embodiment, to guard against heap pollution when reflecting on an object the result of which is an instance of a type variable in source code (for example, calling method List<String>::get), the descriptor retains generic information at the use site. The generic information may be used to adapt the resolved method handle's return type, before it is adapted to the operation result.

For the method descriptor java.util.List<String>::get(int i)Object, the receiver type is generic and has a parameterized type of List<String>. In addition, resolution of the descriptor shows that the method has a declaring class with a type parameter that is a type variable E, and the method has a generic return type that is the type variable E. Therefore, the return value of the method is an instance of String and the method handle's return type needs to be adapted to String.

The same also applies for generic methods, such as:

```
class Foo {
    static <T extends Number> T x(T v) {
        ...
    }
}
```

In this example, the method descriptor would be Foo.<Integer>::get(Number v)Number. Similar to the preceding example, the descriptor and the result of its resolution provide sufficient information to determine that the resolved method handle's return type needs to be adjusted to Integer.

4.1.14. Translation to Bytecode

In an embodiment, translation to bytecode resolves the descriptors such that the required information is available to generate bytecode. Similarly, in the Java source compiler, classfiles must be present on the module path or classpath. For example, the method descriptor of a method call can be resolved to an instance of java.lang.reflect.Method from which the method's access modifiers can be queried. The access modifiers may then determine whether an invokevirtual or an invokespecial bytecode instruction is generated.

4.1.15. Modeling Lambda Expressions

In an embodiment, the lambda operation definition models lambda expressions. A lambda operation that symbolically describes a lambda includes an operation result whose type describes the functional interface that is the target type of the lambda expression.

A lambda operation includes a body that is not isolated, and therefore any nested operations may capture values defined outside the body. The body includes blocks and operations that describe the code of the lambda body. The body's entry block includes N block parameters, one for each of the functional interface's abstract method parameters, in order. For a given parameter p whose type is t, the block parameter is named p and has a type describing t (or a supertype). The body's method type descriptor includes a return type that describes the functional interface's abstract method return type (or a subtype). The terminal return operation exits the lambda expression and passes control back to the callee.

The following is an example of modeling a lambda expression whose target type is IntUnaryOperator. The lambda expression captures method f's argument:

```
static int f(int i) {
    IntUnaryOperator fi = li -> {
        return i + li;
    };
    int fortyTwo = 42;
    int or = fi.applyAsInt(fortyTwo);
    return or;
}
func @"f" (%0 : int)int -> {
    %1 : java.util.function.IntUnaryOperator = lambda (%2 : int)int -> {
        %3 : int = add %0 %2
        return %3
    }
}
```

-continued

```
%4 : int = constant @42
%5 : int = call %1 %4@ "java.util.function.IntUnaryOperator::applyAsInt(int)int"
return %5
}
```

4.1.16. Quoting Operations

In an embodiment, the quoted operation definition quotes an operation. For example, a lambda operation can be quoted encapsulating the operation and its contents, so it can be presented symbolically in runtime form, rather than processed symbolically as code. The result of a quoted lambda operation can be passed as an argument to a method call, allowing symbolic analysis and transformation of lambda expressions at runtime in some wider context (for example, creating symbolic descriptions that model SQL queries).

```
func @"f" (%0 : int)int -> {
    %1 : java.sd.Quoted<java.sd.CoreOps$LambdaOp> = quoted ( )void -> {
        %2 : java.util.function.IntUnaryOperator = lambda (%3 : int)int -> {
            %4 : int = add %0 %3
            return %4
        }
        break %2
    }
    %5 : int = call %1
        @"Test::accept(java.sd.Quoted<java.sd.CoreOps$LambdaOp>)int"
    return %5
}
class Test {
    static int accept(Quoted<LambdaOp> l) {
        Assert.assertEquals(1, l.capturedValues( ).size( ));
        Assert.assertEquals(1, l.capturedValues( ).values( ).iterator( ).next( ));
        int r = (int) Interpreter.invoke(MethodHandles.lookup( ), l.op( ),
            l.capturedValues( ), 42);
        return r;
    }
}
```

The quoted operation encapsulates the lambda expression and yields an instance of Quoted<LambdaOp>, from which the runtime form of the lambda's symbolic description can be obtained. In addition, any captured arguments can be obtained from that instance.

4.1.17. Modeling Local Variables

In an embodiment, local variables can be modeled in SSA form by defining three operations:

1. A local variable definition operation that accepts an initial value, a variable type, and an optional name. The result of the operation is a variable value of type Var<X> where X is the variable type. The variable value represents a box that holds the value of the variable. A variable value is not accessible by ordinary Java code, nor can it be accessed concurrently by multiple threads; it behaves as if it were stack confined (like Java local variables).
2. A read variable operation, accepting a variable value of type Var<X> and returning the value of the variable of type X.
3. A write variable operation, accepting a value v of type X and a variable value of type Var<X>, that updates the value of the variable to v.

Because the variable value is in SSA form, its usages can be reasoned via a level of indirection. This may be referred to as non-pure SSA.

In many cases, the definition and use of local variables can be replaced with the value they hold; hence why these are core operations (see, e.g., the try operation). These operations serve as a useful modeling tool that captures where local variables are defined in source (including capture of the name). In addition, these operations simplify the design of high-level operations, as discussed in further detail below.

4.2. Java High-Level Dialect

In an embodiment, the Java high-level dialect includes the operations listed in Table 2. While not shown in Table 2, one or more embodiments may also model switch statements and expressions, using modeling techniques described herein. Operations of the high-level dialect may be greatly simplified if the use of local variables within their bodies is modeled explicitly in non-pure SSA form. This approach may be used, for example, for local variables that are written to, because final (or effectively final) local variables can be modeled directly as a value.

A Java dialect operation is not required to return multiple values for updates to all associated local variables. One or more embodiments model the return of a value for an expression (such as a switch expression). This simplification is apparent for nested code (e.g., nested loops where the inner loop updates variables) where, if using pure SSA, values would need to be propagated up the nest.

In an embodiment, lowering to operations in the core dialect may result in the eliding of local variables, assuming they do not need to be retained (see, e.g., the discussion herein of modeling a try statement). Some operations are described in further detail below.

TABLE 2

Operations in Java High-Level Dialect

| Operation | Description |
| --- | --- |
| countedFor | models a counted for loop |
| enhancedFor | models an enhanced for loop |
| while | models a while loop |
| ifelseif | models an if/else if/else statement |
| body | models a nested statement (in curly braces) |
| cor | models a logical conditional-OR expression |
| cand | models a logical conditional-AND expression |
| try | models a try statement |
| break | models break (explicit or implicit) |
| continue | models continue with next loop iteration |

4.2.1. Modeling Loops

One or more embodiments define operations for modeling loops. A graph of basic blocks can model loops and other forms of control flow. However, at that level, the structure of the code is erased. One or more embodiments include specific operations that preserve such structure.

4.2.2. Modeling Enhanced for Loops

In an embodiment, the enhancedFor operation definition models enhanced for statements. An enhancedFor operation that symbolically describes an enhanced for statement includes an operand whose type is a subtype of java.lang. Iterable or an array type. An enhancedFor operation includes a body that models the loop's contained statement. The body's entry block includes an argument that is the element of the Iterable or the array for the loop's current iteration step.

The following is an example of modeling an enhanced for loop, with a body for the expression that returns an Iterable, the body of the element variable definition, and the loop body:

```
static int f(List<Integer> l) {
    int sum = 0;
    for (int i : l) {
        sum += i;
    }
    return sum;
}
func @"f" (%0 : java.util.List<java.lang.Integer>)int -> {
    %1 : Var<java.util.List<java.lang.Integer>> = var %0 @"l";
    %2 : int = constant @0;
    %3 : Var<int> = var %2 @"sum";
    java.enhancedFor
        ^expr( )java.util.List<java.lang.Integer> -> {
            %4 : java.util.List<java.lang.Integer> = var.load %1;
            yield %4;
        }
        ^def(%5 : int)Var<int> -> {
            %6 : Var<int> = var %5 @"i";
            yield %6;
        }
        ^body(%7 : Var<int>)void -> {
            %8 : int = var.load %3;
            %9 : int = var.load %7;
            %10 : int = add %8 %9;
            var.store %3 %10;
            java.continue;
        };
    %11 : int = var.load %3;
    return %11;
};
```

In this example, even though elements of the iterable (the list) are of type Integer, the body's entry block parameter is int. The same unboxing conversion is implicitly performed and follows rules similar to those for conversion of arguments and return values for reflective operations.

One or more embodiments lower the preceding symbolic description to one including only core operations. In addition, one or more embodiments remove the local variable operations:

```
func @"f" (%1 : java.util.List<java.lang.Integer>)int -> {
    %1 : int = constant @0
    %2 : java.util.Iterator<java.lang.Integer> = call %1
        @"java.util.List::iterator( )java.util.Iterator"
    br ^header(%1)
    ^header(%sum : int):
        %4 : boolean = call %2        @"java.util.Iterator::hasNext( )boolean"
        cond_br %4 ^prebody ^entryBlock_split
    ^prebody:
        %5 : int = call %2
            @"java.util.Iterator<java.lang.Integer>::next( )java.lang.Object"
        br
        ^entryBlock(%5)
    ^entryBlock(%i : int):
        %nextSum : int = add %sum %i
        br ^header(%nextSum)
    ^entryBlock_split:
        return %sum
}
```

In an embodiment, lowering requires performing method calls on the iterable value to obtain the iterator, and then performing method calls on the iterator to check if there are any elements, and if so, obtaining the next element. In this example, some method descriptors of the call operations describe methods with erased types, but the types of the values are not erased, because one or more embodiments rely on implicit conversion as specified by reflective operations. The call to obtain the next element ensures that the return value is checked for being an instance of Integer. No explicit cast needs to be inserted, as is the case if the original source were compiled to bytecode (or this description were converted to bytecode).

Using this approach, it becomes harder to determine the original structure of the code. However, there is no need to comprehend the specific semantics of the enhancedFor operation.

4.2.3. Modeling Counted for Loops

In an embodiment, the countedFor operation definition models for statements that are counted loops. A countedFor operation that symbolically describes a for statement includes three operands, all of the same integral type, that correspond to (1) the count start value (inclusive), (2) the count end value (inclusive), and (3) the count step. A countedFor operation includes a body that models the loop's contained statement. The body's entry block includes an argument that is the current count. Counted loops may be easier to identify for statements, but may be harder to identify when represented differently, such as in lowered form. Counted loops can be useful to identify for optimization and transformation purposes.

The following is an example of modeling a for statement that is a counted loop, summing the counts:

```
private static int f(int start, int end, int step) {
    int sum = 0;
    for (int i = start; i < end; i += step) { sum
        += i;
    }
    return sum;
}
func @"f" (%start : int, %end : int, %step : int)int -> {
    %3 : int = constant @0
    %sum : Var<int> = var %3    @"sum"
    countedFor %start %end %step    (%i : int)void -> {
        %6 : int = var.load %sum
        %7 : int = add %i %6
        var.store %sum %7
        continue
    }
    %8 : int = var.load %sum
    return %8
}
```

4.2.4. Modeling While Loops

In an embodiment, the while operation definition models while statements. A while operation that symbolically describes a while statement includes no operands and includes two bodies. The first body (the predicate body) models the while statement's expression, and the second body (the loop action body) models the contained statement. The predicate body yields a boolean value. The following is an example of modeling a while statement:

```
private static int f(int i, int n) { int
    counter = 0;
    while (i < n && counter < 8) {
        counter++;
        if (counter == 5) {
            break;
        }
        i++;
    }
    return counter;
}
func @"f" (%_i : int, %n : int)int -> {
    %2 : int = constant @0
    %i : Var<int> = var %_i @"i"
    %counter : Var<int> = var %2 @"counter"
    while ( )boolean -> {
        %5 : int = var.load %3
        %6 : boolean = lt %5 %n
        cond_br %6 ^cond_2 ^predicate(%6)
        ^cond_2:
            %7 : int = constant @8
            %8 : int = var.load %counter
            %9 : boolean = lt %8 %7 br ^predicate(%9)
        ^predicate(%10 : boolean):
            break %10
    }
    ( )void -> {
        %11 : int = constant @1
        %12 : int = var.load %counter
        %13 : int = add %12 %11
        var.store %counter %13
        br ^ifeq
        ^ifeq:
            %14 : int = constant @5
            %15 : boolean = eq %13 %14
            cond_br %15 ^break_block ^while_body_2
        ^break_block: break
        ^while_body_2:
            %16 : int = var.load %i
            %17 : int = add %16 %11
            var.store %i %17
            continue
    }
    %18 : int = var.load %counter
    return %18
}
```

4.2.5. Modeling If-Then and If-Then-Else Statements

In an embodiment, the ifelseif operation definition models if-then and if-then-else statements. An ifelseif operation that symbolically describes an if-then or if-then-else statement includes zero operands and includes two or more bodies. The sequence of bodies includes pairs of a predicate body and an action body modeling if-then. Optionally, at the end of the sequence of bodies, an action body models an else. The predicate body models the if expression, and the action body models the contained if or else statement. The following is an example of modeling an if-then-else statement:

```
private static String f(int i) {
    String r = null;
    if (i < 1) {
        r = "< ONE";
    } else if (i < 2) {
        r = "< TWO";
    } else if (i < 3) {
        r = "< THREE";
    } else {
        r = ">= THREE";
    }
    return r;
}
func @"f" (%i : int)java.lang.String -> {
    %1 : java.lang.String = constant @null
    %r : Var<java.lang.String> = var %1 @"r"
    ifelseif ( )boolean -> {
        %3 : int = constant @1
        %4 : boolean = lt %i %3
        break %4
    }
    ( )void -> {
        %5 : java.lang.String = constant @"< ONE"
        var.store %r %5
        break
    }
    ( )boolean -> {
        %6 : int = constant @2
        %7 : boolean = lt %i %6
        break %7
    }
    ( )void -> {
        %8 : java.lang.String = constant @"< TWO"
        var.store %r %8
        break
    }
    ( )boolean -> {
        %9 : int = constant @3
        %10 : boolean = lt %i %9
        break %10
    }
    ( )void -> {
        %11 : java.lang.String = constant @"< THREE"
        var.store %r %11
        break
    }
    ( )void -> {
        %12 : java.lang.String = constant @">= THREE"
        var.store %r %12
        break
    }
    %13 : java.lang.String = var.load %r
```

-continued

```
        return %13
}
```

One or more embodiments lower this symbolic description to one including only core operations. In addition, one or more embodiments remove the local variable operations:

```
func @"f" (%i : int)java.lang.String -> {
    %1 : java.lang.String = constant @null
    %2 : int = constant @1
    %3 : boolean = lt %0 %2
    cond_br %3 ^entryBlock ^entryBlock_1
  ^entryBlock:
    %4 : java.lang.String = constant @"< ONE" br ^end(%4)
  ^entryBlock_1:
    %5 : int = constant @2
    %6 : boolean = lt %0 %5
    cond_br %6 ^entryBlock_2 ^entryBlock_3
  ^entryBlock_2:
    %7 : java.lang.String = constant @"< TWO"
    br ^end(%7)
  ^entryBlock_3:
    %8 : int = constant @3
    %9 : boolean = lt %0 %8
    cond_br %9 ^entryBlock_4 ^entryBlock_5
  ^entryBlock_4:
    %10 : java.lang.String = constant @"< THREE" br ^end(%10)
  ^entryBlock_5:
    %11 : java.lang.String = constant @">= THREE"
    br ^end(%11)
  ^end(%r : java.lang.String):
    return %r
}
```

Note that in this example, the ifelseif operation is more expressive than the corresponding Java construct that it models, because predicate bodies are not constrained to only modeling Java expressions.

4.2.6. Modeling Try/Catch/Finally

In an embodiment, the try operation definition models a try/catch/finally statement. A try operation that symbolically describes a try statement includes at most three bodies, in order: a body for the try statement of code; an optional body for catch clauses and statements; and an optional body for the finally statement. Multiple catch regions of the Java language construct are merged into a single body, with instanceof checks for each exception class. The catch body's entry block includes an argument whose type is Throwable, and therefore distinguishes itself from a finally body that does not include any arguments.

The try operation specifies how control is passed from the try body to the catch body and to the finally body. If an exception occurs in the try body, then control passes to the catch body, passing the exception as a value to the catch body's entry block. If a finally body is present, then (a) before the terminal operation that exits from a try or catch body is processed, control is passed to the finally body and (b) if the finally body exits via a break, then control is passed back to the try or catch region to process the terminal operation.

As an example:

```
static int f(int[ ] a, int i) {
    int r = 0;
    try {
        r = a[i];
    } catch (ArrayIndexOutOfBoundsException e) {
        throw e;
    } catch (NullPointerException e) {
        throw e;
    finally
        a[0]= 42;
    }
    return r;
}
```

The preceding method may be modeled with the following symbolic description:

```
func @"f" (%0 : int[ ], %1 : int)int -> {
    %2 : int = constant @0
    %3 : Var<int> = var %2 @"r"
    try ( )void -> {
        %4 : int = array.load %0 %1
        var.store %3 %4 break
    }
    (%5 : java.lang.Throwable)void -> {
        %6 : boolean = instanceof %5
            @"java.lang.ArrayIndexOutOfBoundsException" cond_br %6
            ^catchAioobe ^checkNpe
      ^catchAioobe:
        %7 : java.lang.ArrayIndexOutOfBoundsException = cast %5
            @"java.lang.ArrayIndex throw %7
      ^checkNpe:
        %8 : boolean = instanceof %5
            @"java.lang.NullPointerException" cond_br %8
            ^catchNpe ^rethrow
      ^catchNpe:
        %9 : java.lang.NullPointerException = cast %5
            @"java.lang.NullPointerException throw %9
      ^rethrow:
        throw %5
    }
    ( )void -> {
        %10 : int = constant @0
        %11 : int = constant @42
        array.store %0 %10 %11
        break
    }
    %12 : int = var.load %3
    return %12
}
```

The second body of the try operation, the catch body, models the catch clauses and statements for catching and processing Array IndexOutOfBoundsException and NullPointerException exceptions. The body tests that the Throwable value is an instance of either an ArrayIndexOutOfBoundsException or NullPointerException; otherwise, the value is rethrown. In this example, the body includes multiple (basic) blocks, some of which are reached by conditional branching on the result of the instanceof operation. Alternatively, the model may declare multiple catch bodies, one for each exception type, in order, thereby more closely modeling the source structure. The modeling of a multi-catch clause would still follow the same approach as above.

One or more embodiments model the local variable that the try statement updates explicitly with a var operation. The try body performs a var.store operation, which should never throw any exception (although the throwing of an Error may still be possible for abnormal conditions).

The var operation and the relevant operations may be elided, updating the try operation to yield the value it currently stores in the local variable, as follows:

```
func @"f" (%0 : int[ ], %1 : int)int -> {
    %2 : int = constant @0
    %3 : int = try ( )void ->
        %4 : int = array.load %0 %1
        break %4
    }
    ...
    return %3
}
```

If, in the try body, a local variable were stored to and loaded from in the catch or finally body, then one or more embodiments may not elide the var.load operation, because the value that should replace the operation's result is not known.

5. TRANSFORMING A JAVA PROGRAM USING AN SDL MODEL

Figure 6:
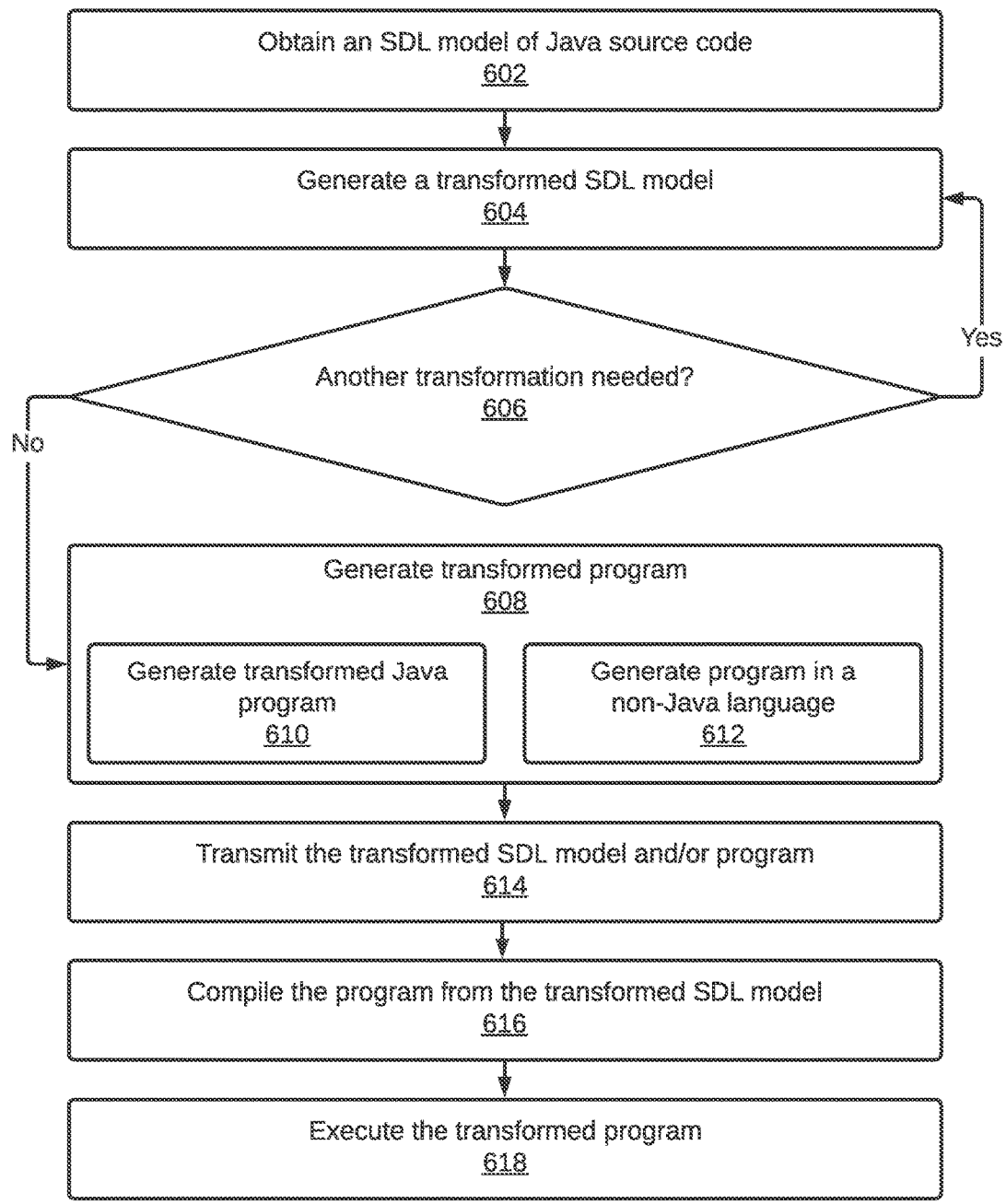
FIG. 6 illustrates an example set of operations for transforming a Java program using a symbolic description language (SDL) model in accordance with one or more embodiments.

FIG. 6 illustrates an example set of operations for transforming a Java program using a symbolic description language (SDL) model in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In the following discussion, the term "system" refers to any system, or component(s) thereof, that is/are configured to generate program transformations based on SDL models of Java source code. For example, the system may refer to a compiler and/or stand-alone tool. The system may further include a runtime environment (e.g., the JRE) configured to execute bytecode corresponding to the Java source code and/or the transformed program.

In an embodiment, the system obtains an SDL model of a set of Java source code (Operation 602). The SDL model represents not only the Java source code's functionality, but also language constructs that would otherwise be lost in compilation to bytecode. Generating an SDL model of Java source code is discussed in further detail in co-pending U.S. patent application Ser. No. 18/168,025, titled "MODELING JAVA SOURCE CODE IN A SYMBOLIC DESCRIPTION LANGUAGE," which is hereby incorporated by reference.

In some cases—for example, if the desired transformation is to replicate similar functionality using a different programming language than Java—it may not be necessary to transform the SDL model itself. Alternatively or additionally, the system may generate a transformed SDL model (Operation 604), based on the SDL model. For example:

- The system may generate a transformed SDL model that represents an optimized version of the original SDL model. The SDL model may elucidate opportunities for eliminating redundant language structures, simplifying logic branches, identifying opportunities for multi-threading, etc.
- The system may generate a transformed SDL model that represents a differentiated version of the SDL model. For example, a machine learning algorithm may use gradient descent techniques that start from the original Java source code and generate differentiated versions of the Java source code. The differentiation process can use SDL models, so that the differentiated Java source code is based on complete descriptions of the types and semantic structures defined therein.
- The system may transform the model in some other way or combination thereof.

If the system supports multiple transformations (for example, simultaneous transformations of different kinds and/or iterative transformations), it may determine whether another transformation is needed (Operation 606). The system may continue sequentially and/or iteratively transforming the SDL model (Operation 604) until all the necessary transformations have been completed.

In an embodiment, the system generates a transformed program (Operation 608), based on the transformed SDL model (or the original SDL model, if no transformations were performed on the SDL model). The system uses the definitions set forth in the transformed SDL model to generate the corresponding program. The resulting transformed program preserves user-defined types and language constructs such as loops that are represented in the transformed SDL model. Thus, for example, a loop that is present in the original Java source code and not removed intentionally as part of a transformation will still be present in the transformed program.

The system may generate a transformed Java program (Operation 610). A transformed Java program has functionality that differs in some way from the original source code. For example, the transformed Java program may perform better according to some performance metric (e.g., processing speed, memory utilization, network utilization, etc.) than if the original Java source code were compiled to bytecode. Alternatively or additionally, the transformed Java program may be a differentiated version of the original Java program and/or include one or more other kinds of transformations.

Alternatively or additionally, the system may generate a program in a non-Java language (Operation 612). Because an SDL model accurately represents the types and semantic structures defined in the Java source code, the corresponding program in the other language can be functionally similar to the Java version, to the extent that the functionality is supported by the other programming language. In some cases, functionality not supported by the other programming language may be omitted from the transformed program. In general, the system may translate definitions in the SDL model to the closest equivalents in the non-Java programming language. The other programming language may be a domain-specific language, i.e., a language that is designed for use in a specific operating domain. Parallel Graph AnalytiX (PGX) is an example of a domain-specific language designed for use in graph analysis.

In an embodiment, an SDL model can be transmitted from one system to another without any loss of information about the code that the SDL model represents. The system may transmit the SDL model (i.e., the original SDL model and/or a transformed SDL model) and/or transformed program itself to another system (Operation 614). For example, the system may transmit one or both via email, an API call, and/or some other computer-based transmission medium. Transmitting an SDL model and/or transformed program allows for SDL processing to occur in one system while the results can be shared across one or more different systems. For example, one or more embodiments may provide SDL processing services in a multi-tenant model.

In some cases, a transformed SDL model is the desired product. Alternatively or additionally, a transformed SDL model may be compiled to obtain the transformed program (Operation 616). If the transformed program is a Java program, the system may compile the SDL model into Java bytecode. If the transformed program is in another language, the system may compile the SDL model into another format (e.g., an executable file, non-Java bytecode, etc.), using a compiler suited to that language (e.g., a C++ compiler, if the transformed source code is in C++). If compiling a transformed SDL model that has undergone one or more optimizing transformations, the resulting bytecode may operate more efficiently than bytecode compiled from the original source code. Thus, for example, techniques described herein may be integrated into an accelerating VM such as TornadoVM. The system may then execute the transformed program (Operation 618).

6. EXAMPLE EMBODIMENTS

A detailed example is described below for purposes of clarity. Components and/or operations described below should be understood as one specific example which may not be applicable to certain embodiments. Accordingly, components and/or operations described below should not be construed as limiting the scope of any of the claims.

Figure 7:
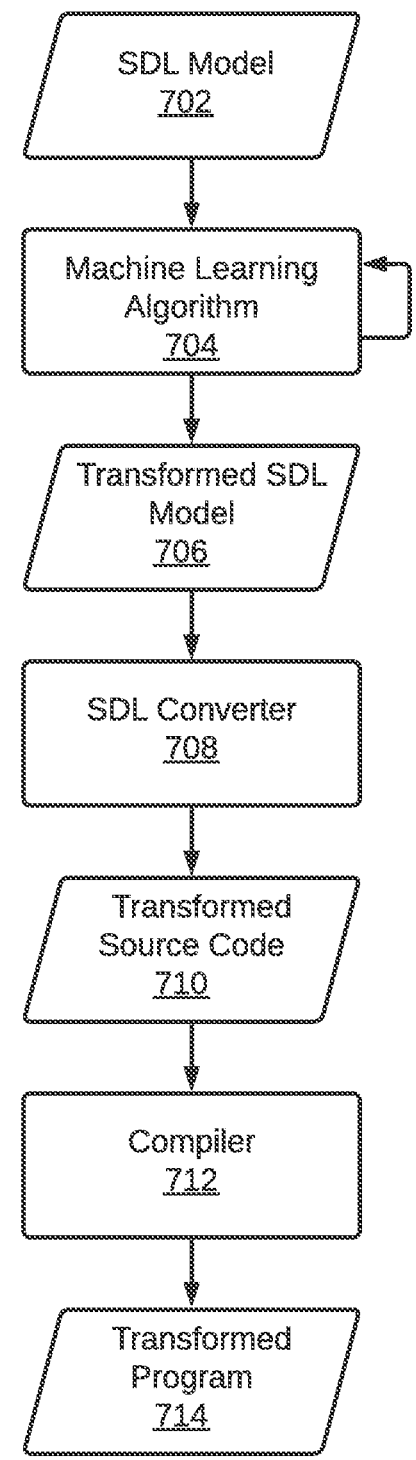
FIG. 7 illustrates an example of transforming a Java program using a symbolic description language (SDL) model in accordance with one or more embodiments.

Specifically, FIG. 7 illustrates an example of transforming a Java program using a symbolic description language (SDL) model in accordance with one or more embodiments. In this example, a machine learning algorithm 704 is configured to iterate over transformations of an SDL model 702 until a threshold condition is satisfied. The threshold condition may vary depending on the kind and purpose of machine learning being performed. For example, the machine learning algorithm 704 may use gradient descent techniques that start from an SDL model 702 that represents an original set of Java source code. Some machine learning techniques are described in further detail below. After the threshold condition is satisfied, an SDL converter 708 may convert the transformed SDL model 706 into transformed source code 710. A compiler 712 may generate a transformed program 714 (from transformed source code 710 and/or directly from the transformed SDL model 706) for distribution and/or execution.

As another example, one or more embodiments may obtain an SDL representation of a source program as described herein. The system may extract a machine learning model from the SDL. The machine learning model itself may also be represented in SDL, which may be convertible to an executable model. The system may use the machine learning model to generate a differentiated model, e.g. for the purpose of performing gradient descent techniques. Alternatively or additionally, one or more embodiments may use a third-party machine learning tool and transform the machine learning model into a form of model required by the third-party tool. The system may split the source SDL into (a) an SDL representation that is compiled into bytecode and executed on the host, and (b) the executable model, which the host may load and execute in whichever machine learning tool is used. The system may then monitor the machine learning and extract the result.

7. MACHINE LEARNING

In one or more embodiments, a machine learning algorithm is an algorithm that can be iterated to learn a target model that best maps a set of input variables to one or more output variables, using a set of training data. The training data includes datasets and associated labels. The datasets are associated with input variables for the target model. The associated labels are associated with the output variable(s) of the target model. The training data may be updated based on, for example, feedback on the accuracy of the current target model. Updated training data may be fed back into the machine learning algorithm, which may in turn update the target model.

The machine learning algorithm may generate the target model such that the target model best fits the datasets of the training data to the labels of the training data. Specifically, the machine learning algorithm may generate the target model such that when the target model is applied to the datasets of the training data, a maximum number of results determined by the target model match the labels of the training data. Different target models be generated based on different machine learning algorithms and/or different sets of training data.

The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

8. ADDITIONAL EXAMPLES

Appendix A to this Specification, incorporated herein by reference in its entirety, describes additional examples in accordance with one or more embodiments.

The class definition supplied in Appendix A includes tests and SDL representation output for examples described herein. Each example presents the textual form of SDL representations of the code in a Java method following, in order:
  (1) The high-level representation containing operations in the high-level and core dialect.
  (2) The transformation of (1) into a representation containing operations only in the core dialect.
  (3) The transformation of (2) into pure SSA.
  (4) The transformation of (3) to operations in the bytecode dialect, from which the system may generate bytecode.
In these examples, programming meaning is preserved.

The examples in Appendix A model each catch as a separate body. Alternatively, one or more embodiments may merge catches into one catch body. One or more embodiments may swap the existing clauses around in the application and focus first on separate catch bodies. For multi-catch (e.g., catch (IndexOutOfBounds|IOException e)) in embodiments that do not model the union type "IndexOutOfBounds|IOException", one or more embodiments may perform instanceof checks and casts. In these examples, the bodies have names, for ease of identification.

In an embodiment, lowering the try operation requires inlining the code in the finally body just before exit points of the try and catch bodies. One or more embodiments further identify regions in the code that may throw and catch exceptions. The exception.region.enter and exception.region.exit operations support this approach.

One or more embodiments model an enhanced for statement as the java.enhancedFor operation, which includes three bodies:
  A first body corresponds to the expression whose result is an instance of Iterable. The body yields the iterable value.
  A second body accepts an element from the iterable and yields a variable for the element.
  A third body accepts the variable for the element. The body terminates with java.continue, which passes control back to the operation. The operation then proceeds to obtain the next element from the iterable. Otherwise, if there is a java.break operation then, control is passed back to the operation which then passes control back to the parent block.

One or more embodiments model a for statement as a java.for operation, which includes four bodies:
  A first body corresponds to the init statement that initiates loop variables. The loop variables are yielded from the body (if there is more than one, then one or more embodiments return a tuple holding the two or more variables)
  A second body corresponds to the condition expression, which accepts the loop variables and yields a boolean value.
  A third body corresponds to update expression statement, which accepts the loop variables and modifies one or more of them.
  A fourth body corresponds to the body statement, which accepts the loop variables and may choose to continue with loop iteration or break out of the loop before the condition expression returns false.

One or more embodiments model a while statement as a java.while operation, which includes two bodies:
  A first body corresponds to the condition expression, which yields a boolean value.
  A second body corresponds to the body statement, which may choose to continue with loop iteration or break out of the loop before the condition expression returns false.

In the example in Appendix A, the loop operation's condition body includes the operation java.cand modeling the binary conditional &&expression, and the operation's loop body contains a java.if operation modeling the if statement.

One or more embodiments model an if statement as a java.if operation, which includes 2N+1 bodies, where N corresponds to the number condition (or corresponding then) expressions. The bodies are arranged, in order, corresponding to the condition expression yielding a boolean value, and the then statement yielding a void value, and so on, and ends with the body corresponding to the final else statement.

9. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. HARDWARE OVERVIEW

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 8:
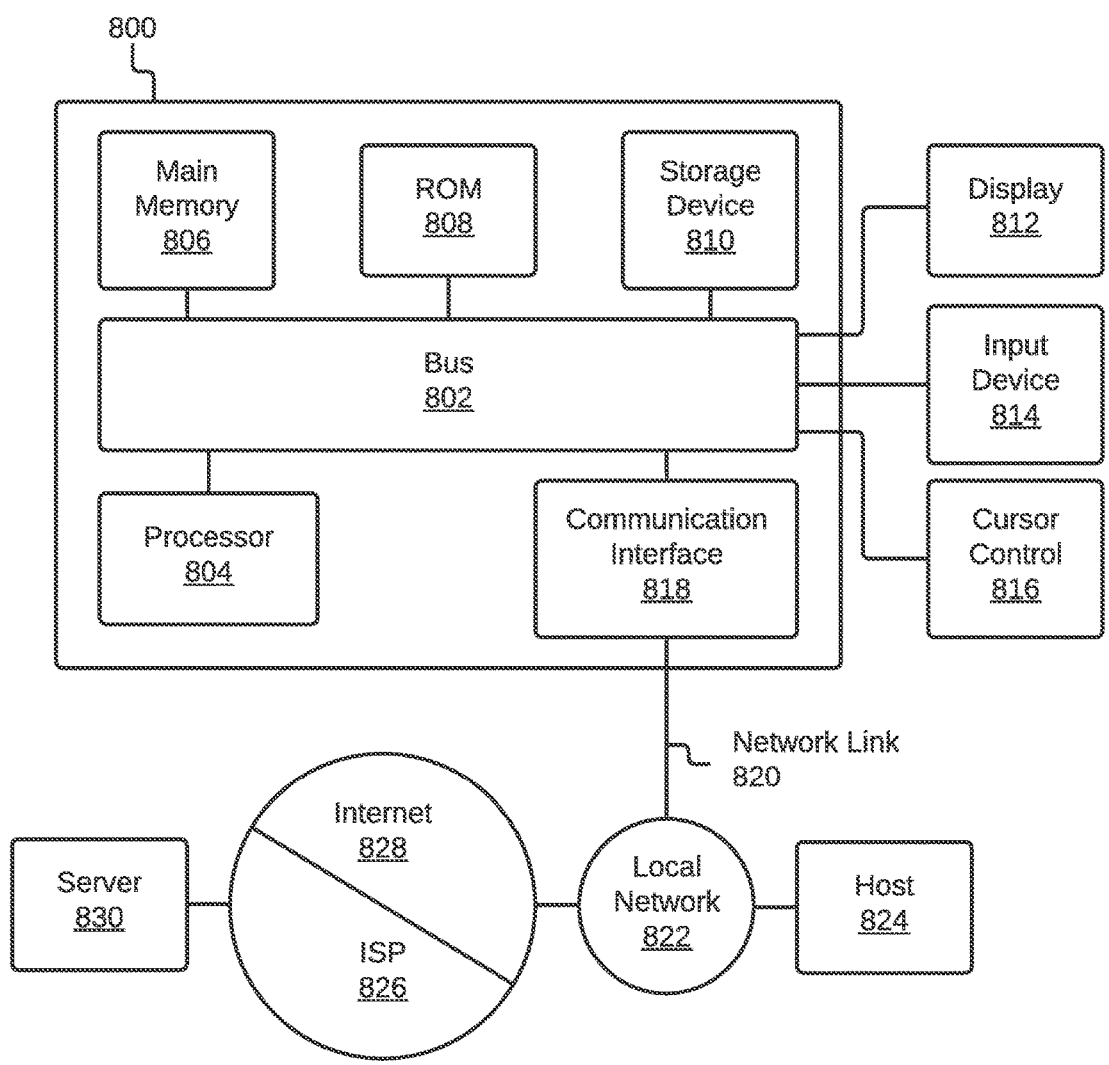
FIG. 8 shows a block diagram that illustrates a computer system in accordance with one or more embodiments.

For example, FIG. 8 is a block diagram that illustrates a computer system 800 upon which one or more embodiments of the invention may be implemented. The computer system 800 includes a bus 802 or other communication mechanism for communicating information, and a hardware processor 804 coupled with bus 802 for processing information. The hardware processor 804 may be, for example, a general-purpose microprocessor.

The computer system 800 also includes a main memory 806, such as a random access memory (RAM) or other dynamic storage device, coupled to bus 802 for storing information and instructions to be executed by processor 804. The main memory 806 also may be used for storing temporary variables or other intermediate information during execution of instructions to be executed by processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a cathode ray tube (CRT), for displaying information to a computer user. An input device 814, including alphanumeric and other keys, is coupled to the bus 802 for communicating information and command selections to the processor 804. Another type of user input device is cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement techniques described herein using customized hard-wired logic, one or more ASICs or FPGAs, firmware, and/or program logic which in combination with the computer system 800 causes or programs the computer system 800 to be a special-purpose machine. In one or more embodiments, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 810. Volatile media includes dynamic memory, such as the main memory 806. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 802. Transmission media can also take the form of acoustic or light waves, such as those generated during radio frequency (RF) and infrared data communications.

Various forms of media may be involved in carrying one or more sequences of one or more instructions to the processor 804 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 800 can receive the data on the telephone line or other communications medium and use an infrared transmitter to convert the data to an infrared signal. An infrared detector can receive the data carried in the infrared signal and appropriate circuitry can place the data on the bus 802. The bus 802 carries the data to the main memory 806, from which the processor 804 retrieves and executes the instructions. The instructions received by the main memory 806 may optionally be stored on the storage device 810, either before or after execution by processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. As another example, the communication interface 818 may be a local area network (LAN) card configured to provide a data communication connection to a compatible LAN. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through a local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), network link 820, and communication interface 818. In the Internet example, a server 830 might transmit a requested code for an application program through the Internet 828, ISP 826, local network 822, and communication interface 818.

The received code may be executed by processor 804 as it is received, and/or may be stored in the storage device 810 or other non-volatile storage for later execution.

11. MISCELLANEOUS; EXTENSIONS

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions that, when executed by one or more processors, cause performance of operations comprising:
   obtaining a set of Java source code corresponding to a Java program;
   generating a symbolic description language (SDL) model of the set of Java source code, wherein the SDL model represents the set of Java source code using a schema comprising:
      an operation comprising a name, zero or more operands, an operation result, zero or more attributes, and a body;
      the body comprising one or more blocks; and
      each block in the one or more blocks comprising, respectively, one or more respective operations;
   generating, based on the SDL model, a transformed program comprising at least one transformation relative to the Java program, wherein generating the transformed program comprises one or more of:
      a) iterating, by a machine learning model, over transformations of the SDL model until a threshold condition is satisfied; or
      b) compiling, by a compiler configured to generate executable code based on SDL models, the transformed program; and
   performing, at runtime by a runtime environment configured to execute the transformed program, a reflection operation using at least part of the SDL model.

2. The one or more non-transitory computer-readable media of claim 1, wherein generating the transformed program comprises:
   generating, based on the SDL model, a differentiated SDL model;
   generating, based on the differentiated SDL model, a differentiated program.

3. The one or more non-transitory computer-readable media of claim 1, wherein generating the transformed program comprises:
   generating, based on the SDL model, an optimized SDL model;
   generating, based on the optimized SDL model, an optimized program.

4. The one or more non-transitory computer-readable media of claim 1, wherein generating the transformed program comprises:
   generating, based on the SDL model, a program that (a) performs one or more functions defined in the set of Java source code and (b) is written in a language other than Java.

5. The one or more non-transitory computer-readable media of claim 4, wherein the language other than Java is a domain-specific language.

6. The one or more non-transitory computer-readable media of claim 1, the operations further comprising:
   executing the transformed program.

7. A system comprising: at least one device comprising one or more hardware processors, the system being configured to perform operations comprising:
   obtaining a set of Java source code corresponding to a Java program;
   generating a symbolic description language (SDL) model of the set of Java source code, wherein the SDL model represents the set of Java source code using a schema comprising:
      an operation comprising a name, zero or more operands, an operation result, zero or more attributes, and a body;
      the body comprising one or more blocks; and
      each block in the one or more blocks comprising, respectively, one or more respective operations;
   generating, based on the SDL model, a transformed program comprising at least one transformation relative to the Java program, wherein generating the transformed program comprises one or more of:
      a) iterating, by a machine learning model, over transformations of the SDL model until a threshold condition is satisfied; or
      b) compiling, by a compiler configured to generate executable code based on SDL models, the transformed program; and
   performing, at runtime by a runtime environment configured to execute the transformed program, a reflection operation using at least part of the SDL model.

8. The system of claim 7, wherein generating the transformed program comprises:
   generating, based on the SDL model, a differentiated SDL model;
   generating, based on the differentiated SDL model, a differentiated program.

9. The system of claim 7, wherein generating the transformed program comprises:
   generating, based on the SDL model, an optimized SDL model;
   generating, based on the optimized SDL model, an optimized program.

10. The system of claim 7, wherein generating the transformed program comprises: generating, based on the SDL model, a program that (a) performs one or more functions defined in the set of Java source code and (b) is written in a language other than Java.

11. A method comprising:
   obtaining a set of Java source code corresponding to a Java program;
   generating a symbolic description language (SDL) model of the set of Java source code, wherein the SDL model represents the set of Java source code using a schema comprising:
      an operation comprising a name, zero or more operands, an operation result, zero or more attributes, and a body;
      the body comprising one or more blocks; and
      each block in the one or more blocks comprising, respectively, one or more respective operations;
   generating, based on the SDL model, a transformed program comprising at least one transformation relative to the Java program, wherein generating the transformed program comprises one or more of:
      a) iterating, by a machine learning model, over transformations of the SDL model until a threshold condition is satisfied; or b) compiling, by a compiler configured to generate executable code based on SDL models, the transformed program;

performing, at runtime by a runtime environment configured to execute the transformed program, a reflection operation using at least part of the SDL model; and wherein the method is performed by at least one device comprising one or more hardware processors.

12. The method of claim 11, wherein the transformed program is a transformed Java program.

13. The method of claim 11, wherein generating the transformed program comprises:

generating, based on the SDL model, a differentiated SDL model;

generating, based on the differentiated SDL model, a differentiated program.

14. The method of claim 11, wherein generating the transformed program comprises:

generating, based on the SDL model, an optimized SDL model;

generating, based on the optimized SDL model, an optimized program.

15. The method of claim 11, wherein generating the transformed program comprises:

generating, based on the SDL model, a program that (a) performs one or more functions defined in the set of Java source code and (b) is written in a language other than Java.

16. The method of claim 15, wherein the language other than Java is a domain-specific language.

17. The method of claim 11, wherein iterating, by the machine learning model, over transformations of the SDL model until the threshold condition is satisfied comprises:

executing, by the machine learning model, a gradient descent algorithm that starts with the SDL model and iterates over the transformations of the SDL model until the threshold condition is satisfied.

18. The method of claim 11, further comprising:

extracting an SDL representation of the machine learning model from the SDL model;

generating the machine learning model based on the SDL representation of the machine learning model.

19. The method of claim 11, wherein compiling the transformed program comprises:

generating a lowered SDL model, at least by transforming an SDL representation of a high-level operation into a plurality of SDL representations of lower-level operations;

compiling the lowered SDL model.

* * * * *